United States Patent [19]

Takase et al.

[11] Patent Number: 5,502,483
[45] Date of Patent: Mar. 26, 1996

[54] VIDEO CAMERA APPARATUS

[75] Inventors: Satoshi Takase, Takasaki; Takuya Imaide, Fujisawa; Toshiro Kinugasa, Hiratsuka; Hiroyuki Komatsu, Yokohama, all of Japan

[73] Assignee: Hitachi, Ltd., Japan

[21] Appl. No.: 171,005

[22] Filed: Dec. 21, 1993

[30] Foreign Application Priority Data

Dec. 24, 1992 [JP] Japan ..................... 4-344369

[51] Int. Cl.$^6$ ............................. H04N 5/228; H04N 7/01
[52] U.S. Cl. ........................ 348/208; 348/413; 348/416
[58] Field of Search ...................... 348/208, 425, 348/319, 448, 413; 382/300, 107; H04N 5/228, 7/01

[56] References Cited

U.S. PATENT DOCUMENTS

| 4,574,311 | 3/1986 | Resnikoff et al. ............. 348/319 |
| 5,070,403 | 12/1991 | Wilkinson ..................... 348/413 |

FOREIGN PATENT DOCUMENTS 4-10783  1/1992  Japan ........................ H04N 5/262

OTHER PUBLICATIONS

"VHS Camcorder With Electronic Image Stabilizer" by Oshima et al, IEEE Transactions On Consumer Electronics, vol. 35, No. 4, pp. 749–757, Nov., 1989.

*Primary Examiner*—Joseph Mancuso
*Assistant Examiner*—Andrew B. Christensen
*Attorney, Agent, or Firm*—Bardehle Pagenberg Geissler et al.

[57] ABSTRACT

The present invention relates to a video camera apparatus which can automatically correct an image vibration, such as a handling or the like electronically. A control circuit changes an interpolation coefficient $\alpha$ of an interpolation processing circuit in response to a detected output from a vibration detecting apparatus or an output from a motion vector calculating apparatus that detects a vibration of a video signal. Also, the control circuit controls a scanning pulse generating circuit that derives a scanning pulse for scanning the imager. The scanning pulse generating circuit changes a combination of two scanning lines that are to be interpolated by the interpolation processing circuit using the interpolation coefficient $\alpha$ by changing the scanning state of the imager when $0 \leq \alpha < X$ or $(1-X) < \alpha \leq 1$ and $X \leq \alpha \leq (1-X)$ if X is a limited value of the interpolation coefficient $\alpha$ and the limited value X is a value smaller than ½. Thus, a resolution of a reproduced picture based on the video signal thus obtained by the above interpolation processing can be prevented from being deteriorated.

7 Claims, 5 Drawing Sheets

COMBINATION A

COMBINATION B

FIG. 5

VIDEO CAMERA APPARATUS

BACKGROUND OF THE INVENTION

The present invention relates to a video camera apparatus using an imager and, more particularly, is directed to a video camera apparatus having a function to electronically correct an image vibration caused by a handling or the like.

Recently, with the progress of semiconductor technologies, video camera apparatus have been more and more miniaturized and made light-weight. Concurrently therewith, a very small vibration of a reproduced picture due to a handling or the like becomes conspicuous when a picked-up video signal is reproduced.

To solve the aforesaid problems, the technology for correcting an image vibration caused by a handling or the like has been proposed, in which a video camera apparatus includes a vibration detector for detecting an image vibration caused by a handling or the like and an image vibration caused by a handling or the like can be corrected by mechanically moving an optical lens or moving a scanning area of an imager within a photo-sensitive pixel area on the basis of a detected signal from this vibration detector (see paper "VHS CAMCODER WITH ELECTRONIC IMAGE STABILIZER written by OHIMA et al. on IEEE Trans. on CE Vol. 35, No. 4 (Nov. 1989) pp. 749–757).

In the system for correcting an image vibration caused by a handling or the like by moving the scanning area of the imager within the photo-sensitive pixel area on the basis of the detected output from the above-mentioned vibration detector, signals of adjacent horizontal scanning lines (hereinafter simply referred to as adjacent 2H signals) are respectively multiplied by $\alpha$ times (where $0 \leq \alpha \leq 1$) and $1-\alpha$ times and then added by an interpolation processing circuit, whereby the scanning area is moved equivalently. A linear interpolation processing will be described with reference to FIG. 1.

Figure 1:
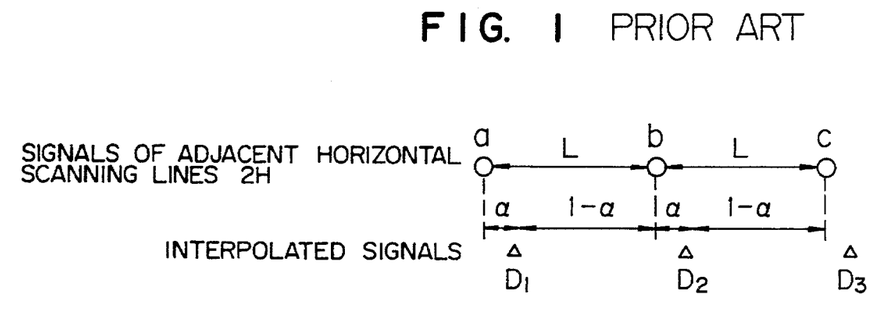
FIG. 1 is a schematic diagram used to explain an interpolation processing according to the prior art.

In FIG. 1 of the accompanying drawings, reference symbols a, b and c depict pixel signals of adjacent horizontal scanning lines, and reference symbol $\alpha$ depicts a coefficient used in the interpolation processing, i.e., interpolation coefficient. Also, reference symbols $D_1, D_2, \ldots$, depict signals that are generated by the interpolation processing, respectively. The signals $D_1, D_2$ are obtained by the following equations (1) and (2) when the signals a and b and the signals b and c are taken as adjacent 2H pixel signals, respectively:

$$D_1 = (1-\alpha) \cdot a + \alpha \cdot b \quad (1)$$

$$D_2 = (1-\alpha) \cdot b + \alpha \cdot c \quad (2)$$

In the above equation (1), when $\alpha$ is 0, then $D_1=a$. When $\alpha=1$, then $D_1=b$. Also, in the above equation (2), when $\alpha=0$, $D_2=b$. When $\alpha=1$, then $D_2=c$.

To correct horizontal and vertical image vibrations caused by the handling or the like, an amount that the scanning area of the imager is moved within the photo-sensitive pixel area in response to the detected signal from the vibration detector must be calculated. Further, to move this scanning area within the photo-sensitive pixel area by the calculated moving amount, the scanning area cannot be moved at the unit smaller than the pixel unit only by controlling the scanning pulse that drives the imager. However, by using the above-mentioned interpolation coefficient $\alpha$ used in the interpolation processing, the scanning area can be moved at the pitch smaller than the pixel unit within the photo-sensitive pixel area.

According to the above-mentioned interpolation processing, if the pixel signal $D_1$ is obtained by interpolating the pixel signals a and b, then the pixel signal $D_1$ can be regarded as the pixel signal located on a scanning line that is assumed to be shifted from the scanning line of the pixel signal a to the scanning line of the pixel signal b by a shift amount $\alpha L$ where L represents an interval between the adjacent two scanning lines. In other words, the above operation becomes equivalent to the operation that the scanning area is moved by the amount $\alpha L$.

Incidentally, when the interpolation coefficient $\alpha$ used in the interpolation processing is changed with the movement of the scanning area, there is then the problem that a resolution of a reproduced picture is deteriorated depending on the value of the interpolation coefficient $\alpha$.

Figure 2:
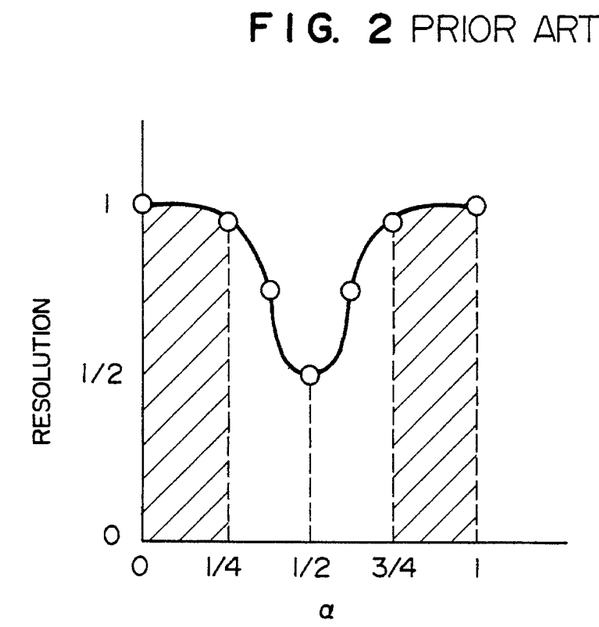
FIG. 2 is a diagram showing measured results of a resolution of a reproduced picture relative to an interpolation coefficient α used in the interpolation processing.

FIG. 2 shows measured results obtained when a resolution of a picture processed by the interpolation processing is changed relative to the change of the interpolation coefficient $\alpha$. Study of FIG. 2 reveals that a resolution of a reproduced picture is deteriorated as the interpolation coefficient $\alpha$ approaches ½, i.e., the signal that results from processing the adjacent 2H signals by the interpolation processing approaches a signal on the scanning line that is assumed to be located at the intermediate position of the two horizontal scanning lines. Especially, the deterioration of the resolution of the reproduced picture except areas $0<\alpha<¼$ and $¾<\alpha<1$ shown hatched in FIG. 2 is remarkable.

SUMMARY OF THE INVENTION

It is a first object of the present invention to provide a video camera apparatus in which the aforesaid shortcomings can be obviated and in which a deterioration of a resolution of a reproduced picture can be suppressed so that an image vibration due to a handling or the like can be corrected.

It is another object of the present invention to provide a video camera apparatus in which a deterioration of a resolution of a reproduced picture can be suppressed even when a scanning area of an imager is moved within a photo-sensitive pixel area in order to correct an image vibration due to a handling or the like.

In order to achieve the aforesaid objects, according to the present invention, a control circuit changes an interpolation coefficient $\alpha$ of an interpolation circuit in response to a detected output of a vibration detecting means, and also controls a scanning pulse generating circuit of an imaging device. The scanning pulse generating circuit changes a combination of two scanning lines that are to be processed by the interpolation processing circuit using the interpolation coefficient $\alpha$ by changing the scanning state of the imager when $0 \leq \alpha < X$ or $(1-X) < \alpha \leq 1$ and $X \leq \alpha \leq (1-X)$ if X assumes a limited value of the interpolation coefficient $\alpha$ and the limited value V is a value smaller than ½.

According to the present invention, similarly to the prior art, the scanning area of the imager can be moved at the unit smaller than the pixel unit within the photo-sensitive pixel area by changing the interpolation coefficient of the interpolation processing circuit in response to the amount of vibration, such as the handling or the like and interpolating the signals of the adjacent horizontal scanning lines 2H by using this interpolation coefficient $\alpha$. When the interpolation coefficient is close to ½, the control circuit controls the scanning pulse generating circuit so that the signals of the adjacent horizontal scanning lines 2H that are to be processed by the interpolation processing circuit are made different. Accordingly, the scanning lines on which pixels are read are shifted on the imaging screen of the imager and hence the interpolation coefficient α of the interpolation processing circuit relative to the signals of the adjacent horizontal scanning lines 2H is set to be a value distant from ½. Therefore, a resolution of a reproduced picture based on a video signal obtained by the above-mentioned interpolation processing can be almost prevented from being deteriorated.

BRIEF DESCRIPTION OF THE DRAWINGS

Preferred embodiments of the present invention will now be described in conjunction with the accompanying drawings, in which.

DESCRIPTION OF THE PREFERRED EMBODIMENTS

Embodiments of the present invention will hereinafter be described with reference to the drawings.

Figure 3:
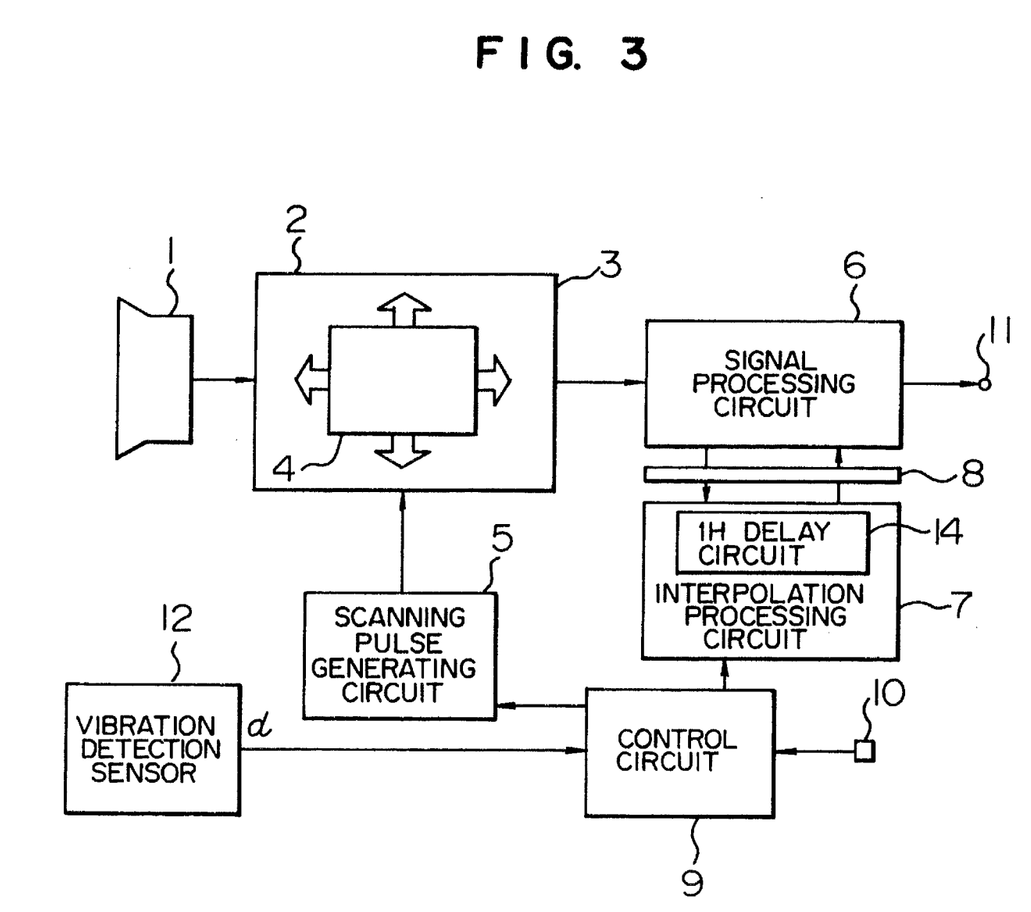
FIG. 3 is a block diagram showing a circuit arrangement of a video camera apparatus according to a first embodiment of the present invention.

FIG. 3 is a block diagram showing a video camera apparatus according to a first embodiment of the present invention. As shown in FIG. 1, a video camera apparatus of the present invention comprises an optical lens 1, an imager 2, a photo-sensitive pixel area 3, a scanning area 4, a scanning pulse generating circuit 6, a signal processing circuit 5, an interpolation processing circuit 7 including a 1H delay circuit, a digital interface 8, a control circuit 9, a control switch 10, an output terminal 11 and a vibration detection sensor 12.

Referring to FIG. 3, an object image focused on an imager 2 through the optical lens 1 is photo-electrically converted by the scanning of the imager 2 and then output as an electrical signal. An output signal from the imager 2 is processed by the signal processing circuit 6 and then output from the output terminal 11 as a video signal. A signal processed by the signal processing circuit 6 is supplied through the digital interface 8 to the interpolation processing circuit 7 which effects an interpolation processing.

The vibration detection sensor 12 detects vibrations of horizontal and vertical directions of the video camera apparatus when a handling occurs, and outputs a detected signal. When the control switch 10 is depressed, the control circuit 9 reads the detected signal d of the vibration detection sensor 12 and calculates a moving amount of the scanning area of the imager 2 within the photo)sensitive pixel area of the imager 2 in order to cancel the picture vibration occurred due to the handling or the like. Then, the control circuit 9 supplies data to the scanning pulse generating circuit 5 which generates a scanning pulse used to energize the imager 2 to perform the scanning in response to the calculated moving amount and the interpolation processing circuit 7.

Figure 4A:
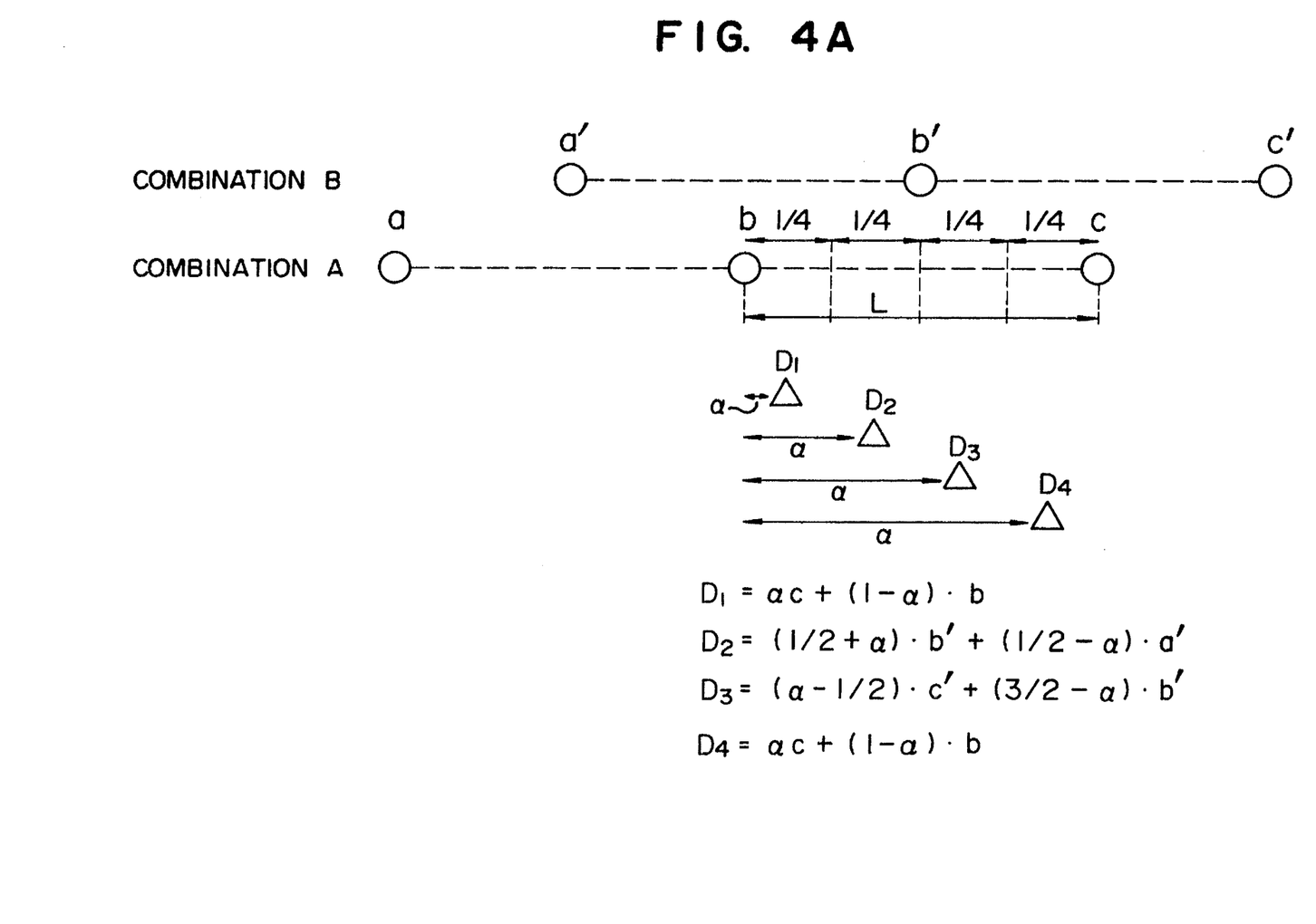
FIGS. 4A through 4C are schematic diagrams showing an interpolation processing of the first embodiment shown in FIG. 3, respectively.
Figure 4B:
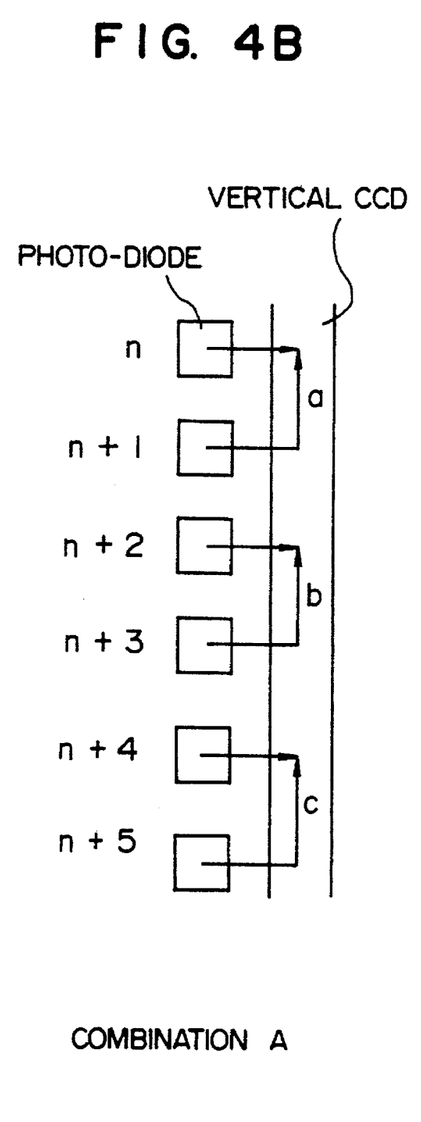
Figure 4C:
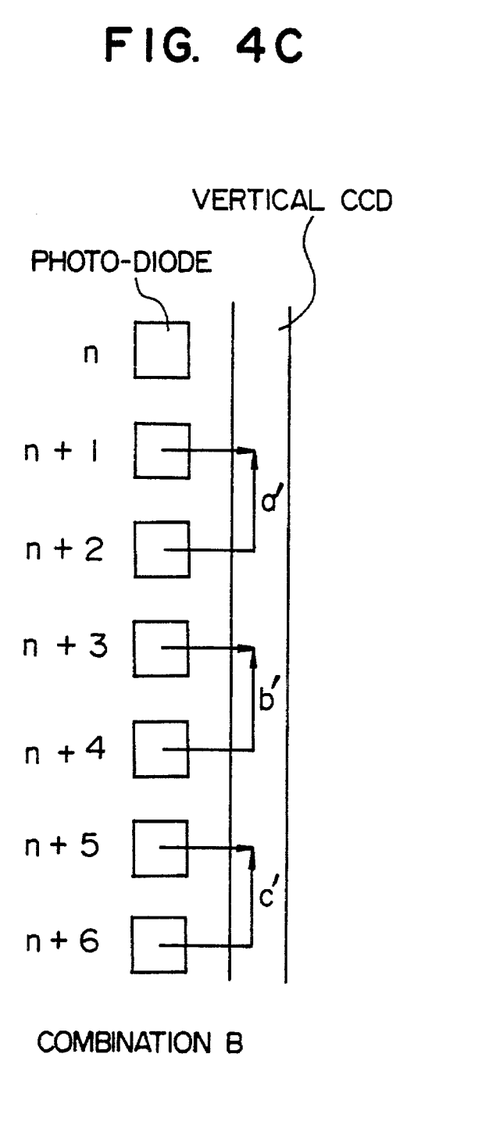

The scanning pulse generating circuit 5 generates scanning pulses corresponding to the data supplied thereto from the control circuit 9 as shown in FIGS. 4A through 4C. Also, the interpolation processing circuit 7 performs the interpolation processing by an interpolation coefficient α corresponding to the data supplied thereto from the control circuit 9. A signal generated by the interpolation processing in the interpolation processing circuit 7 is supplied through the digital interface 8 to the signal processing circuit 6. Thus, the signal processing circuit 6 derives a video signal in which a deterioration of a resolution can be suppressed and in which an image vibration due to a handling or the like can be avoided.

The scanning pulse corresponding to the handling and the interpolation processing will be described with reference to FIGS. 4A through 4C.

The imager 2 comprises photo)diodes serving as pixels of N rows and M columns. The charges photo-electric transferred by each photo-diode are read out to a vertical CCD (Charge-Coupled Device) by the scanning pulse, and then the charges read out from the adjacent photo-diodes in the vertical direction are mixed. The method for reading out the signal is an ordinary method as "Two Line Mixed Readout". Accordingly, pixel columns of two rows constitute one scanning line.

As shown in FIG. 4A, reference symbol a depicts a mixed pixel signal from a pixel signal of a photo-diode of a n'th line and a pixel signal of a photo-diode of a (n+1)'th line. Similarly, hereinafter, reference symbol b depicts a mixed pixel signal of a pixel signal of a photo-diode of a (a+2)'th line and a pixel signal of a photo-diode of a (n+3)'th line, and reference symbol c depicts a mixed pixel signal of a pixel signal of a photo-diode of a (n+4)'th line and a pixel signal from a photo-diode of a (n+5)'th line. It is needless to say that pixels signals are read out from the photo-diodes at that time in such a fashion that pixels signals are read from the n'th line and the (n+1)'th line simultaneously, pixel signals are read out from the (n+2)'th line and (n+3)'th line simultaneously, ... Accordingly, the n'th line and the (n+1)'th line constitute one scanning line. At the same time, the (n+2)'th line and the (n+3)'th line constitute one scanning lines, the (n+4)'th line and the (n+5)'th line constitute one scanning line, ..., respectively.

When the above-mentioned mixed pixel signals a, b and c are output from the imager 2, they are shifted in time by 1H each. However, the mixed pixel signals a, b and the mixed pixel signals b, c are made the same in timing by delaying the output signal of the imager 2 by 1H by the 1H delay circuit 14.

The scanning pulse generating circuit 5 generates a pulse so that, if the above-mentioned read period is taken as an odd field, then the (n+1)'th line and the (n+2)'th line are simultaneously read out, the (n+3)'th line and (n+4)'th line are read out simultaneously, ..., during the even field as shown in FIG. 4C. Reference symbols a', b'and c' in FIG. 4A depict mixed pixel signals obtained at that time, respectively. More specifically, reference symbols a' depicts a mixed pixel signal of pixel signals from the photo)diodes on the (n+1)'th line and the (n+2)'th line, reference symbol b' depicts a mixed signal of pixel signals from the photo-diodes on the (n+3)'th line and the (n+4)'th line, and reference symbol c' depicts a mixed pixel signal of pixel signals from the photo-diodes on the line (n+5)'th line and (n+6)'th line.

Accordingly, in this case, the (n+1)'th line and the (n+2)'th line constitute one scanning line and, similarly, the (n+2)'th line and the (n+4)'th line constitute one scanning line, the (n+5)'th line and the (n+6)'th line constitute one scanning line, . . . , respectively.

In this way, the scanning lines are shifted by a pixel amount of one line in the odd field and the even field. Also in this case, this operation is equivalent to the processing such that, similarly to the video camera apparatus which effects an interlace scanning by reading out every other pixel columns one by one, the scanning lines are read out by shift amounts of one scanning line by reading out every other scanning lines in the odd field and the even field, respectively.

According to the interpolation processing of the first embodiment of the present invention, not only the mixed pixel signals a, b, c, . . . , but also the mixed pixel signals a', b', c' are used by controlling the scanning pulse generating circuit 5 by the control circuit 9 in response to the handling amount. Therefore, the image vibration due to the handling can be corrected and the deterioration of the reproduced picture can be suppressed.

When the control circuit 9 fine adjusts the moving amount of the scanning area at the unit of smaller than the pixel unit in response to the handling amount detected by the vibration detection sensor 12, the interpolation coefficient α corresponding to this fine adjustment amount is set in the interpolation processing circuit 7. Then, the control circuit 9 supplies data to the interpolation processing circuit 7 such that the above-mentioned fine adjustment is equivalently carried out by the interpolation processing using this interpolation coefficient α as shown in FIG. 1.

Further, the control circuit 9 controls the scanning pulse generating circuit 5 in response to data supplied to the interpolation processing circuit 7, accordingly, the interpolation coefficient α set in the interpolation processing circuit 7 to thereby select the reading of any of the pixel signals shown in FIGS. 4B and 4C. When the pixel signals are read out as shown in FIG. 4B, there are obtained the mixed pixel signals a, b, c as shown in FIG. 4A (hereinafter this combination of the mixed signals will be referred to as a combination A). When the pixel signals are read out as shown in FIG. 4C, the mixed pixel signals a', b', c' are obtained as shown in FIG. 4C (hereinafter this combination of the mixed pixel signals will be referred to as a combination B). The interpolation processing circuit 7 selects the combinations A and B in response to the interpolation coefficient α set by the control circuit 9. More specifically, when $0<\alpha \leq 1/4$ and $3/4<\alpha \leq 1$, the combination A is selected by the interpolation processing circuit 7, and when $1/4<\alpha \leq 3/4$, the combination B is selected by the interpolation processing circuit 7, respectively.

If a timing at which the interpolation processing is carried out in the mixed pixel signals b and c is determined by selecting the combination A shown in FIG. 4A, then when $0<\alpha \leq 1/4$ and $3/4<\alpha \leq 1$, the combination A is selected, and pixel signals $D_1$, $D_4$ that result from the interpolation processing by using the interpolation coefficient α are expressed by the following equations (3) and (4):

$$D_1 = \alpha c + (1-\alpha) \cdot b \text{ where } 0<\alpha \leq 1/4 \quad (3)$$

$$D_4 = \alpha c + (1-\alpha) \cdot b \text{ where } 3/4<\alpha \leq 1 \quad (4)$$

Therefore, assuming that L represents an interval provided between every other scanning lines in the photo-sensitive pixel area, then the scanning area of the imager device 2 is equivalently fine adjusted so as to locate the position α·L from the scanning line of the mixed pixel signal b. In addition, since the interpolation coefficient α is sufficiently distant from the $1/2$ ($0<\alpha \leq 1/4$, $3/4<\alpha \leq 1$), deterioration of a resolution of a reproduced picture can be suppressed.

Further, when $1/4<\alpha \leq 1/2$ and $1/2<\alpha \leq 3/4$, then the combination B is selected and pixels signals $D_2$, $D_3$ that result from the interpolation using the interpolation coefficient α are expressed by the following equations (5) and (6):

$$D_2 = (1/2-\alpha) \cdot a' + (1/2+\alpha) \cdot b' \text{ where } 1/4<\alpha = 1/2 \quad (5)$$

$$D_3 = (3/2-\alpha) \cdot b' + (\alpha-1/2) \cdot c' \text{ where } 1/2<\alpha \leq 3/4 \quad (6)$$

More specifically, the interpolation is performed by using the mixed pixel signal b' that is located at the central position of the mixed pixel signals b and c, and the adjacent mixed pixel signals a' and c'. In this case, when the mixed pixel signal b' is examined, the movement of the scanning area between the mixed pixel signals b and c is carried out such that the fine adjustment of the movement of the scanning area falls within a range of +L/4 from the position of the mixed pixel signal b'. Accordingly, the pixel signals $D_2$, $D_3$ are obtained by the above-mentioned calculations.

Therefore, since the interpolation coefficients ($1/2-\alpha$) and ($\alpha-1/2$) fall within the range of from 0 to $1/4$ and the interpolation coefficients ($1/2+\alpha$) and ($3/2-\alpha$) fall within a range of from $3/4$ to 1, the pixel signals $D_2$ and $D_3$ are obtained by the interpolation processing using the interpolation coefficients sufficiently spaced apart from the $1/2$. Thus, the deterioration of the resolution of the reproduced picture can be suppressed.

Figure 5:
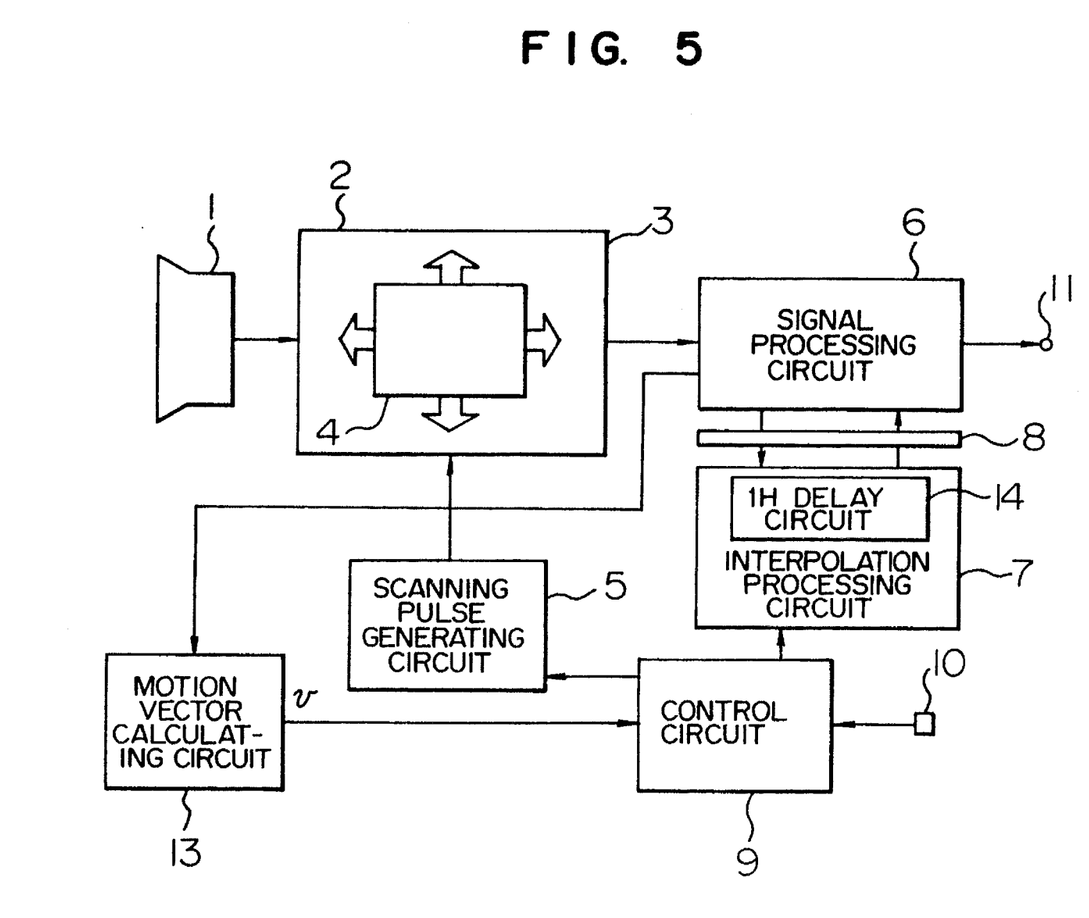
FIG. 5 is a block diagram showing a circuit arrangement of the video camera apparatus according to a second embodiment of the present invention.

FIG. 5 is a block diagram showing the video camera apparatus according to a second embodiment of the present invention, wherein reference numeral 13 designates a motion vector calculating circuit. In FIG. 5, like parts corresponding to those of FIG. 3 are marked with the same references and therefore need not be described in detail.

As shown in FIG. 5, according to the second embodiment, the vibration detection sensor 12 shown in FIG. 3 is replaced with the motion vector calculating circuit 13. This motion vector calculating circuit 13 calculates a motion occurred in the video camera apparatus due to a handling on the basis of an image correlation of the video signal as a vector v. As shown in FIG. 5, when the control switch 10 is depressed, then the control circuit 9 calculates the moving amount of the scanning area of the imager 2 in order to cancel the image vibration due to the handling in response to the motion vector v calculated by the vector calculating circuit 13. Then, similarly to the above)mentioned first embodiment, the control circuit 9 sets the interpolation coefficient α that is used to effect the interpolation processing in the interpolation processing circuit 7, and controls the scanning pulse generating circuit 5.

While the range of the interpolation coefficient α is divided into $0<\alpha \leq 1/4$, $1/4<\alpha \leq 1/2$, $1/2<\alpha \leq 3/4$ and $3/4<\alpha \leq 1$ as described above in the first and second embodiments, the present invention is not limited thereto and any methods may of course be applied inasmuch as the interpolation coefficient α is divided into portions close to and distant from the $1/2$. In general, $0<\alpha \leq X$, $X<\alpha \leq 1/2$, $1/2<\alpha \leq (1-X)$ and $(1-X)<\alpha \leq 1$ and this control value X can be selected to be a value smaller than the $1/2$ determined by the tolerance range in which the deterioration of the resolution can be avoided.

As described above, according to the present invention, even when the scanning area of the imaging device is moved within the photo)sensitive pixel area in order to correct the image vibration, such as the handling or the like, the deterioration of the resolution of the reproduced picture can be suppressed.

What is claimed is:

1. A video camera apparatus comprising:

an imager for scanning a part of a photo-sensitive pixel area in which a focused objective image is photo-electrically converted;

a scanning pulse generating means for generating a scanning pulse that drives said imager;

interpolation processing means for obtaining signals of two adjacent scanning lines from an output signal of said imager and adding said two adjacent scanning lines after multiplying each respectively by an interpolation coefficient $\alpha$ and $(1-\alpha)$;

signal processing means for processing an output signal of said interpolation processing means;

vibration detecting means for detecting a vibration of said video camera caused by external forces; and control circuit means for setting said interpolation coefficient $\alpha$ (where $0 \leq \alpha \leq 1$) of said interpolation processing means in response to a detected output from said vibration detecting means, for controlling said scanning pulse generating means, wherein a limited value X of said interpolation coefficient $\alpha$ is selected to be a value smaller than ½, and for controlling said interpolation processing means wherein a combination of two scanning lines that are to be processed by said interpolation processing means are made different by making a scanning state of said imager different when $0 \leq \alpha \leq X$ or $(1-X) < \alpha \leq 1$ and $X \leq \alpha \leq (1-X)$ if X is limited value of said interpolation coefficient $\alpha$ smaller than ½.

2. A video camera apparatus comprising:

an imager for scanning a part of a photo-sensitive pixel area in which a focused objective image is photo-electrically converted;

scanning pulse generating means for generating a scanning pulse that drives said imager;

interpolation processing means for obtaining signals of two adjacent scanning lines from an output signal of said imager and adding said two scanning lines after multiplying each respectively by $\alpha$ and $(1-\alpha)$;

signal processing means for processing an output signal of said interpolation processing means;

motion vector calculating means for detecting a vibration of a video signal; and control circuit means for setting an interpolation coefficient $\alpha$ (where $0 \leq \alpha \leq 1$) of said interpolation processing means in response to an output of said motion vector calculating means and controlling said scanning pulse generating means, wherein said control circuit means controls said scanning pulse generating means so that a combination of two scanning lines that are to be processed by said interpolation processing means is made different by changing a scanning state of said imager when $0 \leq \alpha < X$ or $(1-X) < \alpha \leq 1$ and $X \leq \alpha \leq (1-X)$ if a limited value X of said interpolation coefficient $\alpha$ is selected to be a value smaller than ½.

3. A video camera apparatus according to claim 1, wherein said two scanning lines that are to be processed by said interpolation processing means when $X \leq \alpha \leq (1-X)$ are shifted by one scanning line from said two scanning lines that are to be processed by said interpolation processing means when $0 \leq \alpha < X$ or $(1-X) < \alpha \leq 1$.

4. A video camera apparatus according to claim 2, wherein said two scanning lines that are to be processed by said interpolation processing means when $X \leq \alpha \leq (1-X)$ are shifted by one scanning line from said two scanning lines that are to be processed by said interpolation processing means when $0 \leq \alpha < X$ or $(1-X) < \alpha \leq 1$.

5. A system for suppressing deterioration in resolution of a video signal produced by a video camera having an array of photo-sensitive pixels upon which an objective image is focused, which comprises:

a) an imager means for scanning an area of said array to produce an electrical image signal;

b) vibration detecting means for producing a magnitude signal indicative of an amount of movement of said video camera in response to external forces;

c) control circuit means responsive to said magnitude signal for producing an interpolation coefficient $\alpha$ and an area shift signal;

d) a scanning pulse generating circuit means responsive to said area shift signal for generating a scanning pulse to locate said area at a position on said array that is determined by said area shift signal, and to drive said imager to scan said area to produce an image signal;

e) signal processing circuit means for receiving said image signal and for forming a video signal from interpolations of said image signal; and f) interpolation processing circuit means responsive to said interpolation coefficient $\alpha$ and in electrical communication with said signal processing circuit means for producing said interpolations of said image signal by multiplying a first of two adjacent scanning lines of said image signal by said interpolation coefficient $\alpha$ and multiplying a second of said two adjacent scanning lines by $(1-\alpha)$, and thereafter adding resulting products when $0 < \alpha \leq ¼$ and $¾ < \alpha \leq 1$, and, where a second of three adjacent scanning lines of said image signal is vertically located midway between said two adjacent scanning lines of said image signal, by multiplying a first of said three adjacent scanning lines of said image signal by $(½-\alpha)$ and said second of said three adjacent scanning lines by $(½+\alpha)$ and adding resulting products when $¼ < \alpha \leq ½$, and by multiplying said second of said three adjacent scanning lines by $(³⁄_2-\alpha)$ and a third of said three adjacent scanning lines by $(\alpha-½)$ and adding resulting products when $½ < \alpha \leq ¾$.

6. The system set forth in claim 5 wherein a motion vector calculating circuit means is substituted for said vibration detecting means, and said motion vector calculating circuit means receives said image signal from said signal processing circuit means.

7. A method of suppressing deterioration in resolution of a video signal when vibrations smaller than a pixel transversal length occur in a video camera having an array of photo-sensitive pixels upon which an objective image is focused, which comprises the steps of:

a) scanning an area of said array to produce an image signal comprised of signals from each pixel scanned;

b) detecting said vibrations and producing therefrom a magnitude signal indicative of amount of movement of said video camera;

c) producing an interpolation coefficient $\alpha$ and an area shift signal dependent upon said magnitude signal;

d) shifting said area within said array a distance proportional to said magnitude signal;

e) interpolating said image signal to form interpolation signals by multiplying a first of two adjacent scanning lines of said image signal by said interpolation coefficient $\alpha$ and multiplying a second of said two adjacent scanning lines by $(1-\alpha)$ and thereafter adding resulting products when $0<\alpha\leq\frac{1}{4}$ and $\frac{3}{4}<\alpha\leq 1$, and where a second of three adjacent scanning lines of said image signal is vertically located midway between said two adjacent scanning lines of said image signal, by multiplying a first of said three adjacent scanning lines of said image signal by $(\frac{1}{2}-\alpha)$ and said second of said three adjacent scanning lines by $(\frac{1}{2}+\alpha)$ and adding resulting products when $\frac{1}{4}<\alpha\leq\frac{1}{2}$, and by multiplying said second of said three adjacent scanning lines by $(\frac{3}{2}-\alpha)$ and a third of said three adjacent scanning lines by $(\alpha-\frac{1}{2})$ and adding resulting products when $\frac{1}{2}<\alpha\leq\frac{3}{4}$; and f) forming a video signal from said interpolation signals.

\* \* \* \* \*